(12) United States Patent
Akiyama et al.

(10) Patent No.: US 8,639,798 B2
(45) Date of Patent: Jan. 28, 2014

(54) MANAGING CONFIGURATION ITEMS

(75) Inventors: Kazuhito Akiyama, Tokyo (JP); Yasuhiro Suzuki, Tokyo (JP); Tadashi Tsumura, Kangawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 850 days.

(21) Appl. No.: 12/327,548

(22) Filed: Dec. 3, 2008

(65) Prior Publication Data

US 2010/0106821 A1    Apr. 29, 2010

(51) Int. Cl.
*G06F 15/173* (2006.01)

(52) U.S. Cl.
USPC .......................................... 709/224; 707/609

(58) Field of Classification Search
USPC .......................................... 709/224; 707/609
See application file for complete search history.

(56) References Cited

U.S. PATENT DOCUMENTS

| | | | |
|---|---|---|---|
| 5,937,189 A | 8/1999 | Branson et al. | |
| 6,175,831 B1 * | 1/2001 | Weinreich et al. | 1/1 |
| 7,149,744 B1 * | 12/2006 | Tenorio | 1/1 |
| 7,523,128 B1 * | 4/2009 | Miller et al. | 1/1 |
| 7,822,785 B2 | 10/2010 | Ayachitula et al. | |
| 7,958,346 B2 | 6/2011 | Wong | |
| 2004/0210635 A1 * | 10/2004 | Raniere et al. | 709/204 |
| 2006/0224777 A1 | 10/2006 | Sand et al. | |
| 2007/0100712 A1 | 5/2007 | Kilpatrick et al. | |
| 2009/0165090 A1 * | 6/2009 | Glasgow | 726/3 |

FOREIGN PATENT DOCUMENTS

| | | |
|---|---|---|
| JP | 9128036 A | 5/1997 |
| JP | 2001125854 A | 5/2001 |
| JP | 2005031795 A | 2/2005 |
| JP | 2006106936 A | 4/2006 |
| JP | 2007011823 A | 1/2007 |
| JP | 2007164419 A | 6/2007 |
| WO | 2007130203 A1 | 11/2007 |

OTHER PUBLICATIONS

Configuration Discovery and Tracking Terminology, IBM Redbooks Deployment Guide Series: IBM Tivoli Change and Configuration Management Database v1.1, IBM Corp. 2006, (24 pgs).
Ling Tai et al., IBM Tivoli Common Data Model: Guide to Best Practices, IBM Redpaper, IBM Corp. 2008, (7 pgs).
Japanese Office Action, Application No. 2008-009782, dated Jul. 11, 2011, 4 pages.

* cited by examiner

*Primary Examiner* — Brian P Whipple
(74) *Attorney, Agent, or Firm* — Toler Law Group, PC

(57) ABSTRACT

There is provided a method for managing a plurality of configuration items that includes a repository that holds, for each configuration item, one set of data indicating at least one predetermined attribute of the configuration item and a relationship with another configuration item and a discovery section that detects information on configuration items. The method includes creating at least one new set of data from information detected by the discovery section. The method also includes storing the new set of data in the repository and managing the new set of data as a combined configuration item.

20 Claims, 10 Drawing Sheets

MANAGING CONFIGURATION ITEMS

CROSS REFERENCE TO RELATED APPLICATIONS

The present application claims priority from Japanese patent application number 2008-9782 filed on Jan. 18, 2008 and entitled "COMPUTER SYSTEM FOR MANAGING CONFIGURATION ITEM, AND METHOD AND COMPUTER PROGRAM THEREFOR."

FIELD

The present disclosure relates to a computer system, a method and a computer program for managing configuration items. More particularly, the disclosure relates to a computer system, a method and a computer program that manage, as a configuration item, a new set of data created from information detected by a discovery section for detecting information on a configuration item.

BACKGROUND

ITIL (Information Technology Infrastructure Library) is a collection of best practices for achieving an IT service management (ITIL is a registered trademark and a registered community trademark of the Office of Government Commerce). The core of the ITIL is service support and service delivery. One type of service support is configuration management. Configuration management is a process of identifying a configuration item (CI), keeping and updating information on the configuration item, and checking and inspecting the configuration item. A configuration item is a resource to be subjected to configuration management. A configuration item includes not only system resources including hardware and software, but also facilities to provide an IT service, documents, such as a rule book, procedure documents and configuration diagrams on the management of the IT service, services like maintenance information, processes, and human resources. The framework of the ITIL recommends unitary management using a database called a configuration management database (CMDB) to manage a configuration item. The CMDB is a database for recording a relationship between at least one predetermined attribute of a configuration item and another configuration item. Capabilities that are provided by implementing the CMDB include a capability of automatically discovering information on a configuration item (also called discovery or automatic detection) and a capability of automatically updating information on a configuration item (also called tracking). Information on a configuration item is reflected in the CMDB.

International Business Machines Corporation provides "Tivoli Change and Configuration Management Database" (Tivoli CCMDB) as software to assist construction of a CMDB and control an operational process based on the CMDB. In the Tivoli CCMDB, operation management software is implemented to execute discovery and tracking.

The Tivoli CCMDB can identify 300 different configuration items in a distributed network environment, such as a server, a client, an operating system (OS), middleware (Web/AP/DBMS/LDAP, etc.), package software, a management tool, a network device and a storage device, and can automatically discover and update information on individual configuration items, such as information on configuration items of a computer, information on an application which runs on each computer, configuration information of a network attached storage (NAS) or the like connected to each computer, and configuration information of a storage area network (SAN) directly connected to a network. While the method of gathering information on each configuration item differs depending on targets to be managed, a computer system which manages a CMDB regularly accesses the remote interface for management using an SSH (Secure Shell) or the like to read a setting file on the OS or configuration information, or executes a setting acknowledge command. It is therefore unnecessary to introduce an agent program in a configuration item to be managed. Information which is discovered and updated in the above manner is organized to belong to any one of 31 different sections (Computer System, Database, Application, Process), 636 different classes (basic units of data models; belonging to one or more sections), 2609 different attributes (attribute information of data; belonging to one class), 7 different interfaces (a group with high use frequency; belonging to one or a plurality of sections), 57 different relationships, and 49 different data types (types of data Information on the association of each configuration item with another configuration item is given to a GUI display tool, for example, Tivoli Application Dependency Discovery Manager (TADDM). The relationship of each configuration item with another configuration item is visually displayed, using an individual blocks and linkage between the blocks.

SUMMARY

A CMDB in the IT service management may be used in management of IT devices as well as managing, for example, industrial machines and electric home appliances.

The present disclosure provides a method of managing a plurality of configuration items. The method includes holding, at a repository, for each configuration item, one set of data including at least one predetermined attribute of the configuration item and identifying a relationship with another configuration item. The method also includes detecting at a discovery section information related to the configuration items and creating from information detected by the discovery section, a new set of data. The new set of data is stored in the repository and managed as a combined configuration item.

The present disclosure provides a computer system for managing a plurality of configuration items. The computer system includes a repository that holds, for each configuration item, one set of data indicating at least one predetermined attribute of the configuration item and a relationship with another configuration item; a discovery section that detects information on configuration items; and a data creating section that creates, from information detected by the discovery section, at least one new set of data, the new set of data being stored in the repository and managed as one configuration item. The repository may be a CMDB. When the new set of data is stored in the CMDB, the computer system can manage the new set of data.

The discovery section may detect information on a first configuration item and information on at least one second configuration item having a predetermined relationship with the first configuration item. The computer system may further include a determining section that determines whether the information on the first configuration item and the information on the second configuration item fulfill a predetermined condition.

The new set of data may indicate at least one predetermined attribute of a combination of the first configuration item and the second configuration item and a relationship of the combination with another configuration item.

In response to the determination that the predetermined condition is fulfilled, the computer system may treat the combination as a new configuration item (hereinafter called "virtual configuration item") and store the new set of data in the repository as one set of data of the virtual configuration item (hereinafter called "virtual configuration item data"). The first configuration item and the second configuration item can be managed as one virtual configuration item.

The present disclosure further provides a method of managing a plurality of configuration items in a computer system including a repository that holds, for each configuration item, one set of data indicating at least one predetermined attribute of the configuration item and a relationship with another configuration item and a discovery section which detects information on configuration items. The method includes creating at least one new set of data from information detected by the discovery section and storing the new set of data in the repository and managing the new set of data as one configuration item. The repository may be a CMDB. When the new set of data is stored in the CMDB, the computer system can manage the new set of data.

The discovery section may detect information on a first configuration item and information on at least one second configuration item having a predetermined relationship with the first configuration item. The method may cause the computer system to execute the further step of determining whether the information on the first configuration item and the information on the second configuration item fulfill a predetermined condition.

The new set of data may indicate at least one predetermined attribute of a combination of the first configuration item and the second configuration item, and a relationship of the combination with another configuration item.

The method may further include causing the computer system to treat the combination as a new configuration item (hereinafter called "virtual configuration item") in response to the determination that the predetermined condition is fulfilled and storing the new set of data in the repository as one set of data of the virtual configuration item (hereinafter called "virtual configuration item data"). This may make it possible to manage the first configuration item and the second configuration item as one virtual configuration item.

The present disclosure further provides a computer program for use in a computer system including a repository that holds, for each configuration item, one set of data indicating at least one predetermined attribute of the configuration item and a relationship with another configuration item, and a discovery section that detects information on configuration items. The computer program includes code for causing the computer system to execute the aforementioned method. The repository may be a CMDB. When the new set of data is stored in the CMDB, the computer system can manage the new set of data.

A configuration item and a relationship between the configuration item and another configuration item can be implemented, for example, by an instance of static data or an instance of the Java class (Java and all Java-based trademarks are trademarks of Sun Microsystems, Inc. in the United States, other countries, or both).

According to the present disclosure, management of configuration items can be simplified by combining one configuration item with another configuration item and managing the combination as a new configuration item, preferably a configuration item having a new functional unit. Because the number of configuration items to be managed and attributes and relationships of configuration items can be reduced, an administrator can make setting so as to execute discovery and tracking, paying attention only to a necessary managed target or a necessary attribute or relationship. Because the new configuration item can automatically become a managed target, the computer system can dynamically change attributes and relationships to be discovered and tracked.

DETAILED DESCRIPTION

Figure 1:
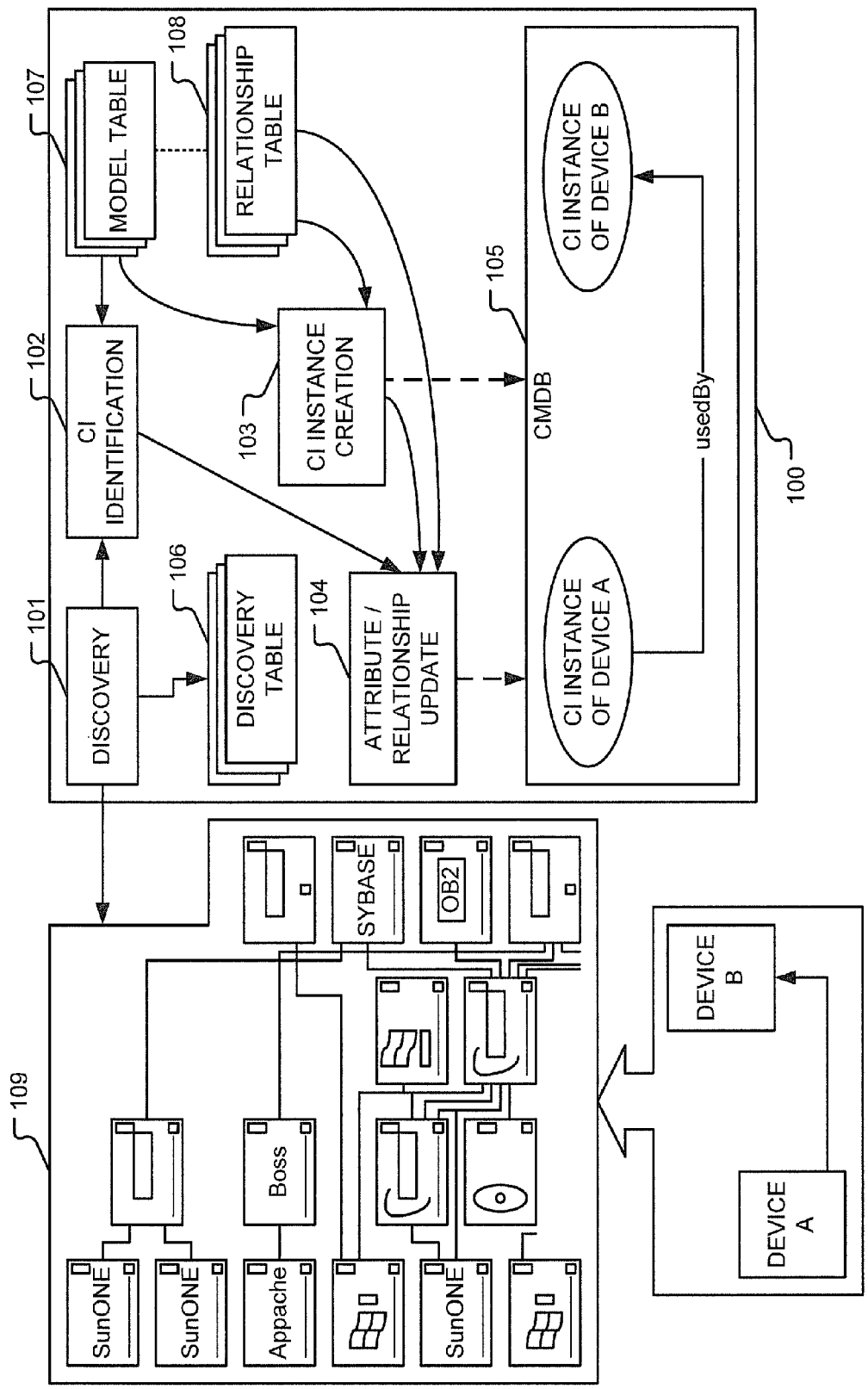
FIG. 1 shows an example of a computer system including a CMDB.

According to the present disclosure, a repository holds, for each configuration item, one set of data indicating at least one predetermined attribute of the configuration item and a relationship with another configuration item. The repository is not particularly limited as long as it holds such a set of data, in an embodiment, it is a CMDB recording section for recording a CMDB. Basic terms on CMDB will be described below.

Configuration Item (CI): CI is a basic unit to be managed by the IT service management. CIs include, for example, system resources including hardware and software, facilities needed to provide an IT service, documents, such as a rule book, procedures document and configuration diagrams on the management of the IT service, services like maintenance information, processes, and human resources.

Configuration Management Database (CMDB): A CMDB is a database for recording a predetermined attribute of each CI and a relationship with another CI. The CMDB is the core of the configuration management of the ITIL framework. While the CMDB is conceptually a database, it can take the form of a database system or a spreadsheet of spreadsheet software in a physical sense. The use of a CMDB may make it easier for an administrator to understand a relationship between CIs.

Configuration Item Instance (CI Instance): A CI instance is data corresponding to a CI. Each CI instance is represented as an instance of a data model on a CMDB. An example of a CI instance is an instance of static data or an instance of the Java class. An implemented instance of the Java class is stored in the CMDB by a scheme of persistently storing an instance of the Java class called, for example, Java Data Objects (JDO). Even when a computer system is powered off, therefore, the created instance of the Java class does not vanish, and is read out from a storage device like a hard disk and deployed in a main memory to become an instance of the Java class which can be changed or deleted by a Java program when the computer system is powered on next. In the following, some explanation will be given on an assumption that a CI is implemented as an instance in a CMDB.

Data Model: A data model is a schema for defining a CI, and is an information model which provides consistent definitions of CIs to be managed and a relationship between those CIs. Specifically, a data model defines a predetermined attribute of a CI and a relationship with another CI (manufacturing apparatus, process or the like). An example of a data model is a data model for a configuration management database "CDM" advocated by IBM. A CDM is implemented based on, for example, the Unified Modeling Language (UML).

Attributes: An attribute specifies an individual CI and explains the CI at the time of managing the CI. The following are available attributes, which are not restrictive: the name of a CI (general name of a CI, such as a server, client or firewall), product number (ID) (number which individually identifies a specific entity of a CI, such as a serial number or production number), category (category of a CI, such as hardware, software or document), type (detailed description of a CI further elaborating the category), model number (model number of a CI named by a supplier), guarantee period (guarantee period given by a CI supplier), version number (version number of a CI), location (location where a CI is present, e.g., site of a PC, archive of software, storage place for media, site where a service is provided), owner (name of a CI administrator), administration start date (date on which the owner has become the CI administrator), supplier (CI developer or provider), license (license number, the number of licenses or the like), supplied date (date on which a CI has been supplied to an organization), acceptance date (date on which a CI has been accepted by an organization), use start date (date on which the use of a CI has started), CI status (current status, e.g., operating, testing or failing status, or a future status like status of a scheduled CI), and status of a CI instance (valid or invalid of a CI instance).

Relationship: A relationship represents a relationship between CIs. A relationship, like a CI, can be defined by a data model. Examples of relationships are assigns, canConnect, canUse, connectAt, connects, controls, deployedOn, Located, Managed, Owned, provides, runAt, uses, and usedBy.

An embodiment of the present disclosure will be described below with reference to the accompanying drawings. It is to be understood that the embodiment is to be considered as illustrative of a preferred embodiment or aspect of the invention and the invention is not to be limited to the details given herein. Same reference numerals denote same components or parts throughout the diagrams unless otherwise specified.

FIG. 1 shows an example of a computer system 100 including a CMDB for managing CIs (e.g., device A and device M). Computer system 100 comprises a discovery section 101, a CI identifying section 102, a CI instance creating section 103, an attribute/relationship update section 104 and a CMDB 105. The discovery section, the CI identifying section, the CI instance creating section, the attribute/relationship update section and the CMDB may be implemented on a single computer or distributively implemented on a plurality of computers. Computer system 100 further comprises at least one discovery table 106, at least one model table 107 and at least one relationship table 108. Those tables may be implemented on a single computer or distributively implemented on a plurality of computers. FIG. 1 also shows an example of a screen 109 of a TADDM console. The screen shows CIs and a connection relationship thereamong. The CIs and a connection relationship thereamong displayed on the screen are merely an example, and are not to show all CIs to be managed and a relationship thereamong.

Discovery section 101 detects (or discovers) information on a CI to be managed in the CMDB. Computer system 100 may have a plurality of discovery sections 101. Managed targets may be connected to computer system 100 over a network. The network can be cable connection or wireless connection. An administrator of computer system 100 can arbitrarily set a target to be detected. The range of the detection can be designated by a domain name, an internet protocol (IP) address, a media access control (MAC) address, a device identifier, or a database name, or any combination thereof. When a CI to be managed is an industrial device, for example, information on the industrial device is detected. The detected information may be information on a new CI, or an updated attribute or relationship value of an existing CI. A "new CI" is a CI which is detected by discovery section 101 but has not been registered with CMDB 105 yet. An "existing CI" is a CI whose instance has already been registered with CMDB 105. Discovery section 101 detects information on a CI according to discovery information 202 (e.g., A-Discovery in FIG. 2B) stored in discovery table 106. Which discovery information is to be used is designated by a discovery scheme in a data model 201 (FIG. 2B). Discovery section 101 passes the detected CI information to CI identifying section 102.

CI identifying section 102 receives the CI information from discovery section 101, and then executes a process on the detection result. CI identifying section 102 refers to CMDB 105 and determines whether the CI information is information on a new CI or an updated attribute or relationship value of an existing CI. The determination is carried out by, for example, comparing the instance name of a CI stored in the CMDB with the CI information. If it is determined that the CI information relates to a new CI, CI identifying section 102 passes the information to CI instance creating section 103. On the other hand, if it is determined that the CI information is an updated attribute or relationship value of an existing CI, CI identifying section 102 passes the information to attribute/relationship update section 104.

CI instance creating section 103 creates, from the information on the CI, one set of data indicating a predetermined attribute of the CI and a relationship with another CI, according to data model 201 (FIG. 2B) stored in model table 107 and a relationship model 204 (FIG. 2B) stored in relationship table 108. The one set of data is instantiated based on the CI information detected by discovery section 101 or CI information manually input (see FIG. 2A). The one set of data can be implemented by an instance of static data or an instance of the Java class. An example of the one set of data is a CI instance. An example of a CI instance is shown in FIG. 2B (203). The one set of data is stored in CMDB 105. The one set of data may have an attribute and a relationship in a CI instance 203, or may have an attribute in a CI instance and a relationship instance separately stored in CMDB 105. In the latter case, the CI instance has a link to specify a pertinent relationship instance.

Attribute/relationship update section 104 implements tracking together with discovery section 101. Attribute/relationship update section 104 reflects an updated attribute or relationship value of a CI in its CI instance stored in the CMDB. That is, the attribute or relationship value of the CI instance of the CI is updated. The update is carried out by replacing the value with the CI information detected by discovery section 101. In the replacement, all the attribute or relationship values of a CI may be replaced with the CI information detected by discovery section 101, or only different values may be replaced.

CMDB 105 records a CI instance 203 (FIG. 2B) of a CI.

Discovery table 106 stores discovery information 202 (FIG. 2B). The discovery information is used at the time discovery section 101 detects information on a CI. Discovery information 202 (FIG. 2B) can be implemented by an instance of static data or an instance of the Java class. The discovery information is also called discovery policy. Discovery information 202 (FIG. 2B) includes the search range of discovery section 101 or the collection target (scope) which is the search range for CIs, attributes to be collected and relationships to be collected (see FIG. 2B). The collection target can be designated by using, for example, a subnet IP address, the range of IP addresses, an individual IP address, a MAC address, a device identifier, a host name or a database name, or a combination thereof. As another embodiment, the collection target may be a schedule management database (not shown) connected to computer system 100 over a network. The schedule management database stores, for example, data on the process management that uses a device. As still another embodiment, the collection target may be a database (not shown) for storing a batch process definition file. When the collection target is a database for storing a batch process definition file, discovery section 101 performs detection by reading the contents of the batch process definition file. The batch process definition file stores data indicating, for example, in what order devices are to be used.

Model table 107 stores a data model 201 (FIG. 2B). The data model is used at the time CI instance creating section 103 creates one set of data indicating a predetermined attribute of the CI and a relationship with another CI.

Relationship table 108 stores a relationship model 204 (FIG. 2B). The relationship model is used at the time CI instance creating section 103 creates one set of data indicating a predetermined attribute of the CI and a relationship with another CI.

FIG. 1 shows that discovery section 101 detects information on devices connected to computer system 100 over a network. Consequently, discovery section 101 detects information on a device A and a device B which uses device A. Next, CI identifying section 102 refers to CMDB 105 and determines whether the information is about a new CI. According to the determination, CI instance creating section 103 creates a CI instance of device A, a CI instance of device B, and an instance of a relationship therebetween (usedBy). As a result, those instances are stored in CMDB 105.

Figure 2A:
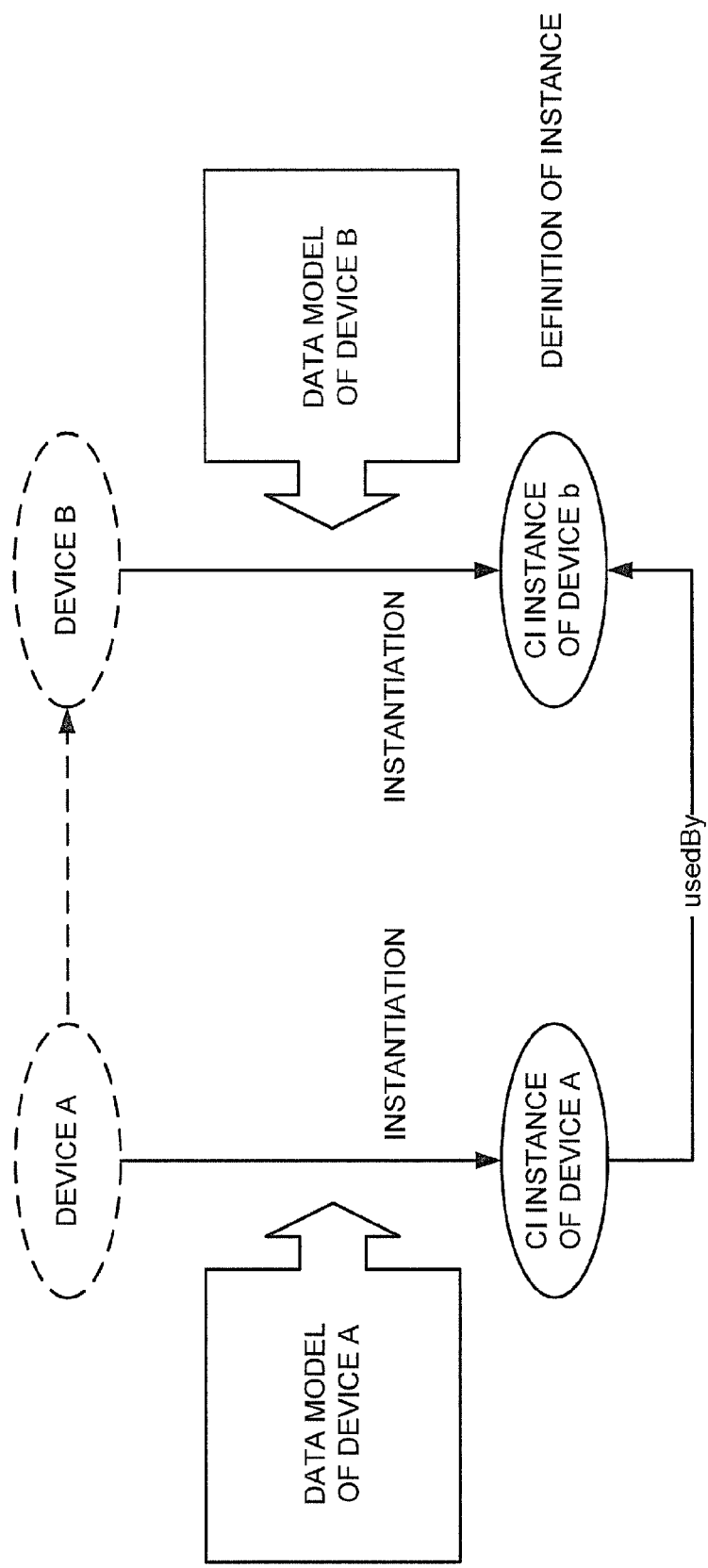
FIG. 2A shows generation of CI instances of a device A and a device B.
Figure 2B:
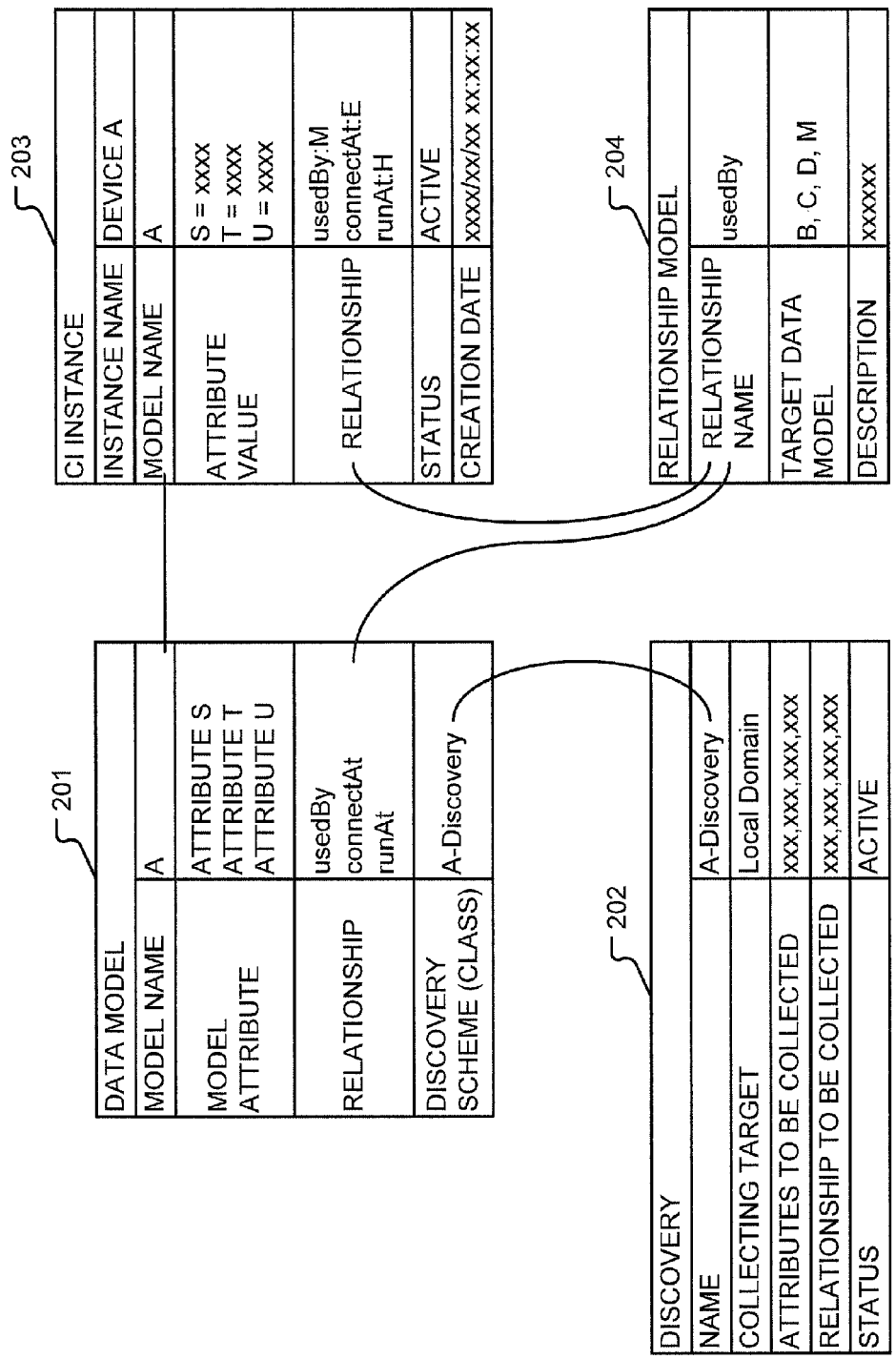
FIG. 2B shows a data model, a discovery instance, a CI instance and a relationship model.

FIG. 2A shows creation of CI instances of CIs (e.g., device A and device B), and an instance of a relationship therebetween (usedBy). The CI instance of device A is created by CI instance creating section 103, from information on device A detected by discovery section 101, using the data model of device A. Likewise, the CI instance of device B is created by CI instance creating section 103, from information on device B detected by discovery section 101, using the data model of device B. The data models of device A and device B are stored in model table 107 (FIG. 1). The instance of the relationship between CIs, namely the relationship between device A and device B (usedBy) is created by CI instance creating section 103, from information on device A detected by discovery section 101, according to the relationship model. The relationship model is stored in relationship table 108.

As mentioned above, FIGS. 2A and 2B show that the CI instance of device B is created by using the data model of device B. It is to be noted however that when devices to be instantiated using the data model of device B are devices B1, B2 and B3, for example, individual information on devices B1, B2, B3 are instantiated using the data model of device B, thereby creating the CI instance of device B1, the CI instance of device B2 and the CI instance of device B3. The CI instances of devices B1, B2, B3 are also stored in CMDB 105.

FIG. 2B shows data model 201 stored in model table 107 (FIG. 1), discovery instance 202 stored in discovery table 106 (FIG. 1), CI instance 203 (of device A) stored in CMDB 105 (FIG. 1), and relationship model 204 stored in relationship table 108 (FIG. 1).

Data model 201 is a schema for defining a CI. Data model 201 includes descriptions of "model name" indicating which CI has a model in question, "model attribute" indicating an attribute of a CI designated by the model name, "relationship" that the CI designated by the model name and another CI can have, and "discovery scheme" that specifies a discovery instance for detecting the CI designated by the model name. The model attribute may be defined according to, for example, an attribute defined by the configuration management database data model "CDM" advocated by IBM, but is not restrictive thereto. In the CDM, 2609 different attributes are defined. The administrator of the CMDB can arbitrarily designate an attribute in data model 201. The relationship is defined according to, for example, a relationship defined in the CDM, but is not restrictive thereto. In the CDM, 57 different relationships are defined. The discovery scheme can be specified by a discovery instance name. The discovery instance name is A-Discovery in the case of FIG. 2B.

Discovery instance 202 includes descriptions of "name" of a discovery instance specified by the discovery scheme of data model 201, "collection target (scope)" of a managed target (CI) to be collected by discovery section 101, "attribute to be collected" and "relationship to be collected" of the managed target (CI) to be collected by discovery section 101, and "status" indicating whether the discovery instance is active or inactive.

CI instance 203 includes descriptions of "instance name" for specifying which CI has the instance, "model name" indicating which data model is used to create the instance, and "attribute value" of each attribute specified by the data model, a description (value) of each "relationship" specified by the data model, and descriptions of "status" indicating whether the instance is active or inactive, and "creation date" on which the CI instance has been created. The CI instance preferably further includes a CI instance identifier specific to the CI instance. The CI instance identifier is not particularly restrictive as long as it can distinguish the CI instance from another CI instance; for example, the CI instance identifier can be a combination of a host name, and a serial number or another attribute which is a constant value. CI instance 203 in FIG. 2B indicates that it is the CI instance of device A; it is instantiated by using data model A; it includes attribute values of S, T and U; as relationships, it is used by B (usedBy: B), is connected to E (connectAt: E), and is executed by H (runAt: H); and it is active and indicates data of its creation date.

Relationship model 204 is a schema for defining a relationship to be specified by data model 201. Relationship model 204 includes descriptions of "relationship name" such as usedBy, "target data model" for specifying a data model to be a target for the relationship, and "description" of the relationship.

Computer system 100, including a CMDB, instantiates each configuration item according to individual data models associated with configuration items to be managed, and manages the configuration items in this form. However, when a CMDB is used to manage industrial devices and electric home appliances, for example, there are a very large number of configuration items, which makes it complicated and difficult to manage the configuration items. This requires some way of simplifying the management of configuration items in order to adequately manage configuration items to be managed.

Figure 3:
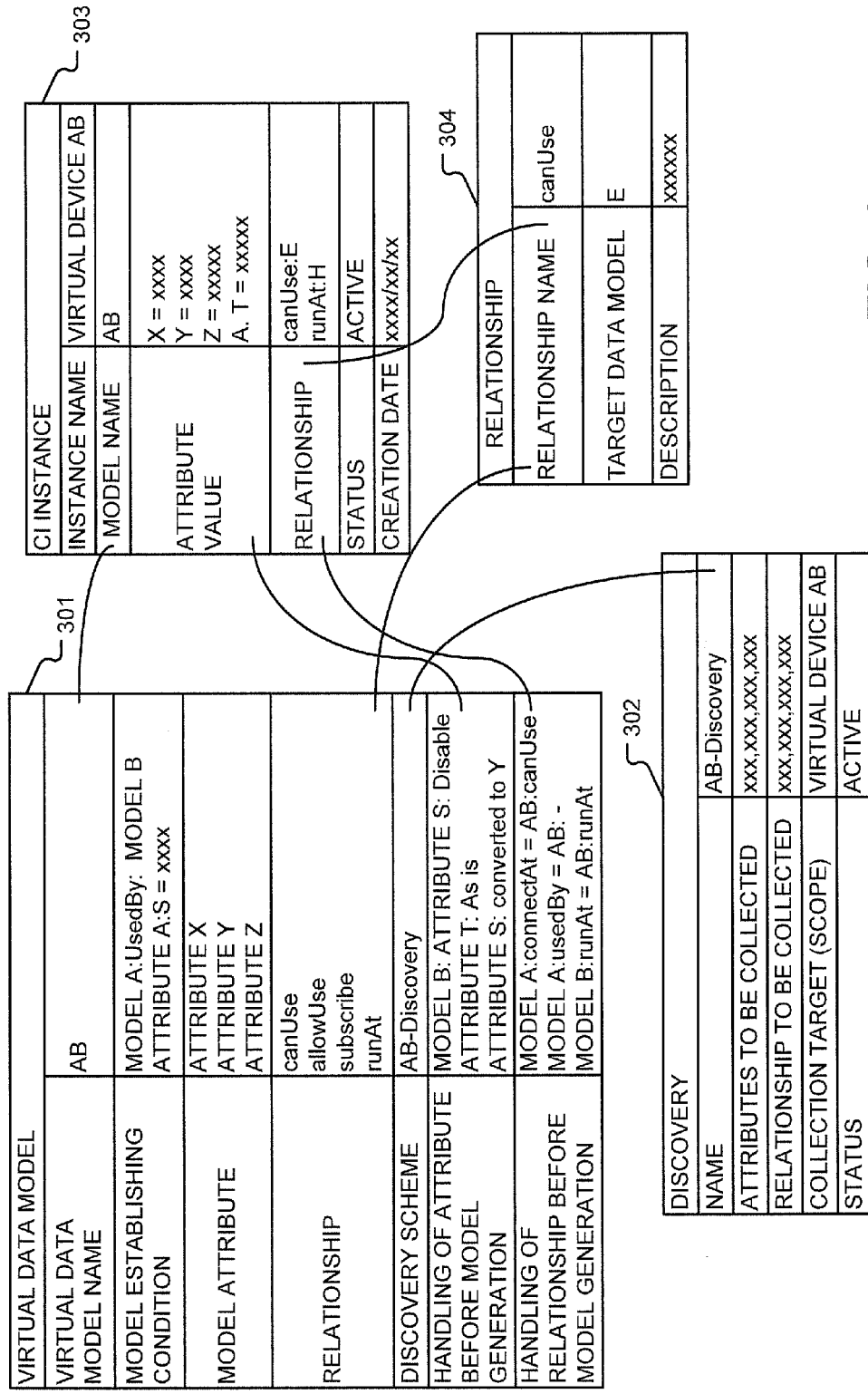
FIG. 3 shows a virtual data model, a discovery instance, a CI instance and a relationship model.

FIG. 3 shows a virtual data model 301 according to an embodiment of the present invention. The specifications of a discovery instance 302, a CI instance 303 of a virtual device AB, and a relationship model 304 are substantially the same as the specifications of discovery information 202, CI instance 203 and relationship model 204 shown in FIG. 2B.

Virtual data model 301 is a schema for defining a predetermined condition for forming a virtual configuration item (hereinafter called "virtual CI"). A virtual CI is a combination of configuration items for managing a plurality of configuration items, detected by the discovery section, as one unit, and it may include a plurality of configuration items to be associated with one another by a functional unit. Association by a functional unit means that a combination of a TV, a video system and an audio system, for example, allows these configuration items to be associated with one another by a new function called a theater system, and, as another example, a combination of a personal computer (PC), a printer and a scanner allows these configuration items to be associated with one another by a new function called a copy machine system.

As described, there may be a case where a configuration item has a certain function as a stand-alone entity and yet its new function is derived when it is used in combination with another configuration item. In other words, when information on a first configuration item and information on at least one second configuration item having a predetermined relationship with the first configuration item fulfill a predetermined condition, a virtual CI is created as a combination of the first configuration item and second configuration item for managing these configuration items as one unit. In a particular embodiment, the predetermined relationship is a relationship set by an administrator to bring about a new function from the collection of a plurality of configuration items. Virtual data model 301 describes a scheme of automatically generating an attribute of a virtual CI created from the virtual data model, and a relationship of the virtual CI with another CI. Virtual data model 301 includes, for example, descriptions of "virtual data model name" indicating which virtual CI has the model, "model establishing condition" which defines a predetermined condition to be fulfilled by a plurality of CIs to form a virtual CI designated by the virtual data model name, "model attribute" indicating an attribute of the virtual CI, "relationship" the virtual CI and another CI (either a CI or a virtual CI) can take, "discovery scheme" which specifies a discovery instance for detecting the virtual CI, "handling of attribute before model generation" which specifies how to handle an attribute included in each of a plurality of CIs forming the virtual CI, and "handling of relationship before model generation" which specifies how to handle a relationship included in each of a plurality of CIs forming the virtual CI.

"Virtual data model name" may be a combination of the model names of data models of a plurality of CIs forming the virtual CI, or a combination of instance names of a plurality of CIs. In virtual data model 301 in FIG. 3, the virtual data model name is designated as AB, since the data model names of a plurality of CIs forming the virtual CI are A and B.

"Model establishing condition" defines a predetermined condition to be fulfilled by a plurality of CIs to form a virtual CI designated by the virtual data model name. The model establishing condition for the virtual data model in FIG. 3 defines conditions to be fulfilled by a relationship that data model A and data model B should have, and a condition to be fulfilled by an attribute of data model A and/or data model B.

"Model attribute" describes an attribute of a virtual CI, which may be the same as or different from an attribute included in a plurality of CI forming the virtual CI. When a virtual CI is formed by a plurality of CIs to have a new function, an attribute specific to the virtual CI, i.e., an attribute which is not included in the plurality of CIs forming the virtual CI may be defined. The model attribute may be defined according to, for example, attributes defined in a data model "CDM for a configuration management database" advocated by IBM, which is not restrictive.

"Relationship" describes a relationship that a virtual CI and another CI (either a CI or a virtual CI) can take. The relationship may be the same as or different from a relationship included in a plurality of CIs forming the virtual CI. When the virtual CI has a new function, a relationship specific to the virtual CI, i.e., a relationship which is not included in the plurality of CIs forming the virtual CI may be defined. The relationship may be defined according to, for example, relationships defined in the CDM, which is not restrictive. A relationship may be specified by designating a class. "Discovery scheme" may be specified by a discovery instance name. In the virtual data model in FIG. 3, the discovery scheme is AB-Discovery.

"Handling of attribute before model generation" specifies how to handle an attribute included in each of a plurality of CIs forming a virtual CI, and describes at least one of disabling the use of the attribute, using the attribute in a virtual CI as it is, converting the attribute into another attribute, replacing the attribute with another attribute, etc. In virtual data model 301 in FIG. 3, "handling of attribute before model generation" shows that an attribute S of data model B is disabled (Disable), an attribute T is used as it is (As is), and an attribute U is converted to an attribute Y (converted to). "Handling of relationship before model generation" specifies how to handle a relationship included in each of a plurality of CIs forming the virtual CI, and describes at least one of disabling the use of the relationship, using the relationship in a virtual CI as it is, converting the relationship into another relationship, replacing the relationship with another relationship, etc. In virtual data model 301 in FIG. 3, the relationship (connectAt) of data model A is converted to the relationship (canUse) of virtual data model AB. In virtual data model 301, "handling of relationship before model generation" shows that the relationship (usedBy) of data model A is disabled (−) in virtual data model AB, and the relationship (runAt) of data model B is used as it is in virtual data model AB (runAt).

Discovery instance 302 includes descriptions of "name" of a discovery instance specified by the discovery scheme of virtual data model 301, "collection target (scope)" of a managed target (virtual CI) to be collected by discovery section 101, "attributes to be collected" and "relationships to be collected" of a managed target (virtual CI) to be collected by discovery section 101, and "status" indicating whether the discovery instance is active or inactive. Discovery instance 302 in FIG. 3 is identical in structure to discovery instance 202 in FIG. 2B.

CI instance 303 is an implementation of a virtual instance. To distinguish CI instance 303 in FIG. 3 from CI instance 203 in FIG. 2B, virtual CI instance 303 will hereinafter be referred to as "virtual CI instance 303" occasionally. It is to be noted however that computer system 100 need not distinguish CI instance 203 and virtual CI instance 303 from each other, since virtual CI instance 303 is specified by a model name. Therefore, virtual CI instance 303 in FIG. 3 is identical in structure to CI instance 203 in FIG. 2B. Virtual CI instance 303 includes descriptions of "instance name" to specify which CI has the virtual CI instance, "model name" indicating which data model is used to create the virtual CI instance, "attribute value" of each attribute specified by the data model, a description (value) of each "relationship" specified by the data model, and descriptions of "status" indicating whether the virtual CI instance is active or inactive, and "creation date" on which the virtual CI instance has been created.

The virtual CI instance may further include a CI instance identifier specific to the (virtual) CI instance. The CI instance identifier is not particularly restrictive as long as it can distinguish the CI instance from another CI instance; for example, the CI instance identifier can be a combination of a host name, and a serial number or another attribute which is a constant value. Virtual CI instance 303 in FIG. 3 indicates that the virtual CI instance is the CI instance of a virtual device AB; the virtual CI instance is formed by using virtual data model AB; the virtual CI instance includes X, Y, Z, A and T as attribute values; as relationships, the virtual CI instance is used by E (canUse: E), and is executed by H (runAt: H); and the virtual CI instance is active and indicates data of the creation date thereof.

Relationship model 304 is a schema for defining a relationship to be specified by (virtual) data model 301. Relationship model 304 includes descriptions of "relationship name" such as canUse, "target data model" for specifying a data model to be a target for the relationship, and "description" of the relationship. Relationship model 304 in FIG. 3 is identical in structure to relationship model 204 in FIG. 2B.

Figure 4:
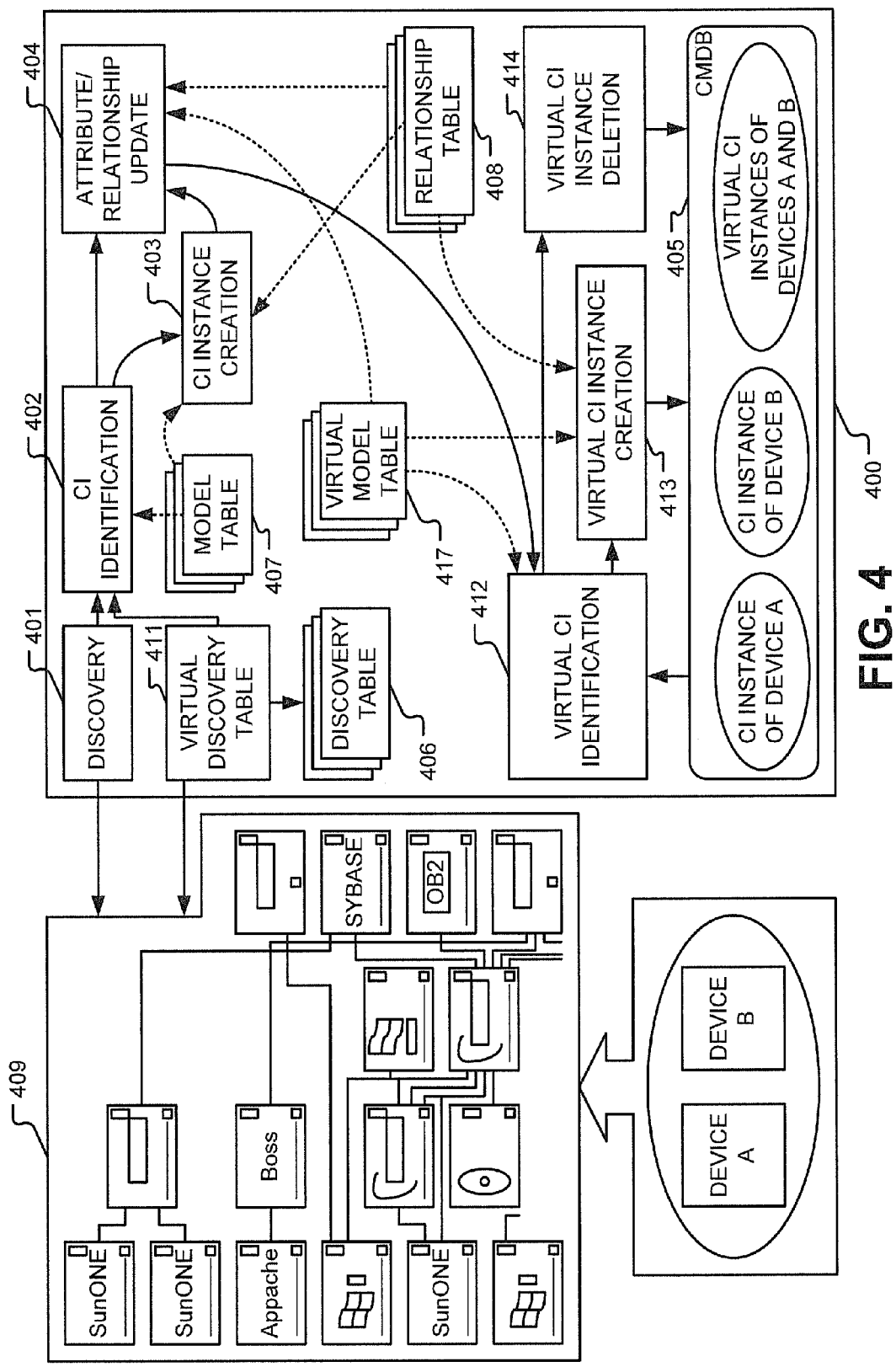
FIG. 4 shows an embodiment of a computer system for managing a plurality of configuration items as a new configuration item.

FIG. 4 shows an embodiment of a computer system 400 for managing a plurality of configuration items as a new configuration item. Specifically, FIG. 4 shows that a device A and a device B are managed as a new configuration item (virtual CI). FIG. 4 also shows an example of a screen 409 of a TADDM console.

Computer system 400 in FIG. 4, like computer system 100 in FIG. 1, comprises a discovery section 401, a CI identifying section 402, a CI instance creating section 403, an attribute/relationship update section 404 and a CMDB 405. Computer system 400 may include CMDB 405 inside, or may have CMDB 405 connected thereto by a cable or over a network. Computer system 400 further comprises at least one discovery table 406, at least one model table 407 and at least one relationship table 408.

Discovery section 401 detects information on a device to be managed which is connected to computer system 400 over a network. Consequently, discovery section 401 detects information on device A, device B which uses device A, and information on the relationship between those devices. Next, CI identifying section 402 refers to CMDB 405 and determines whether the information relates to a new CI. If so, CI instance creating section 403 creates a CI instance of device A, a CI instance of device B, and an instance of the relationship (usedBy) between those devices. CI instance creating section 403 then stores the individual instances in CMDB 405.

A virtual CI identifying section 412 acquires a virtual data model 301 (FIG. 3) from at least one virtual model table 417. Virtual data model 301 (FIG. 3) includes a description of a condition for establishing (model establishing condition) for a virtual CI instance. Virtual CI identifying section 412 checks CI instances stored in CMDB 405 and determines if there is any CI instance which fulfills the establishing condition for a virtual CI instance defined in the virtual data model. When the establishing condition is fulfilled, virtual CI identifying section 412 passes the CI instance which fulfills the establishing condition or information thereon to a virtual CI instance creating section 413. When the establishing condition is not fulfilled, virtual CI identifying section 412 then checks, based on another virtual data model, if there is any CI instance which fulfills the establishing condition for a virtual CI instance defined in that another virtual data model.

Virtual CI identifying section 412 checks if a virtual CI instance which is created as a result of fulfilling the establishing condition is already registered with CMDB 405. When such a virtual CI instance is already registered with CMDB 405, the CI instance fulfilling the establishing condition or information thereon is not passed to virtual CI instance creating section 413. When the virtual CI instance is not registered with CMDB 405, virtual CI identifying section 412 passes the CI instance fulfilling the establishing condition or information thereon to virtual CI instance creating section 413.

Virtual CI identifying section 412 not only checks the establishing condition for generating a virtual CI instance is fulfilled, but also checks a virtual CI instance already registered with CMDB 405 still fulfills the establishing condition defined in a corresponding virtual data model after generation of the virtual CI instance. The check is performed regularly at a time interval defined by the administrator or at an arbitrary time set by the administrator. Data needed to check whether the establishing condition is fulfilled is collected by a virtual CI discovery section 411 (to be described below). When the establishing condition is not fulfilled, virtual CI identifying section 412 passes the virtual CI instance or information thereon to a virtual CI instance deleting section 414 (to be described below). Then, virtual CI instance deleting section 414 deletes a virtual CI instance which does not fulfill the establishing condition from CMDB 405. When the establishing condition is fulfilled, virtual CI instance deleting section 414 then checks whether another virtual CI instance fulfills an establishing condition defined in a corresponding virtual data model.

Virtual CI instance creating section 413 creates a virtual CI instance according to the definition of virtual data model 301 (FIG. 3) stored in virtual model table 417. As virtual CI discovery section 411 detects information on a virtual CI after a virtual CI instance is created, attribute/relationship update section 404 can update at least one of an attribute and relationship of a virtual CI instance. An example of a virtual CI instance is shown in FIG. 3 (303).

Virtual CI instance creating section 413 performs the following processes on a CI instance as a configuration item according to the definition of a virtual data model. Virtual CI instance creating section 413 makes the statuses of a plurality of CI instances as configuration items remain active or sets them inactive. This can make the plurality of CI instances invisible as a managed target. Virtual CI instance creating section 413 decides how to handle the attributes and relationships of a plurality of CI instances as configuration items in a virtual CI instance according to the following criteria. The attributes and relationships of a plurality of CI instances as configuration items are inherited in a virtual CI instance. That is, the attribute and relationship of a virtual CI instance are identical to the attribute and relationship of one of a plurality of CI instances as configuration items. An attribute and a relationship which are unique to a virtual CI instance are used. That is, an attribute and a relationship which are used only for a virtual CI instance are used. The attributes and relationships of a plurality of CI instances as configuration items are not used.

Virtual CI instance creating section 413 also determines whether a plurality of CI instances as configuration items are to be subjected to discovery or are to be eliminated from the discovery targets. When a plurality of CI instances as configuration items are discovery targets, the statuses of discovery instances associated with the plurality of CI instances as configuration items remain active. On the other hand, when a plurality of CI instances as configuration items are removed from discovery targets, virtual CI instance creating section 413 sets the statuses of discovery instances respectively associated with the plurality of CI instances as configuration items inactive. Preferably, virtual CI instance creating section 413 sets the statuses of discovery instances respectively associated with the plurality of CI instances as configuration items inactive to reduce the number of managed targets and disable processes (discovery, tracking, etc.) relating to an individual configuration item.

Further, virtual CI instance creating section 413 sets inactive the status of a discovery instance 302 (FIG. 3) associated with a virtual CI instance, which is stored in discovery table 406. Discovery instance 302 (FIG. 3) is specified by the discovery scheme of a virtual data model. Furthermore, virtual CI instance creating section 413 adds the created virtual CI instance to "attributes to be collected" in discovery table 406. The addition can enable discovery of a newly created virtual CI instance. Virtual CI instance deleting section 414 dynamically deletes from CMDB 405 a virtual CI instance, which does not fulfill a model establishing condition defined in a virtual data model any more. When the deletion is performed, virtual CI instance deleting section 414 sets the status of discovery instance 302 (FIG. 3) associated with the virtual CI instance inactive. Further, virtual CI instance deleting section 414 deletes a description of the virtual CI instance from "attributes to be collected" of a corresponding discovery instance in discovery table 406. Then, virtual CI instance deleting section 414 changes the statuses of a plurality of CI instances forming the virtual CI instance to be deleted to active from inactive. Further, virtual CI instance deleting section 414 adds a plurality of CI instances forming the virtual CI instance to be deleted to "attributes to be collected" of the discovery instance, as needed. As discovery section 401 detects information on a device as a managed target after deletion of the virtual CI instance, attribute/relationship update section 404 can update at least one of the attributes and relationships of a plurality of CI instances forming the virtual CI instance. Virtual CI instance deleting section 414 is set active when the virtual CI instance is created.

Virtual CI discovery section 411 performs detection of information on a managed target or a virtual CI. In a particular embodiment, a virtual CI is connected to computer system 400 over a network. A detection target can be designated by, for example, a domain name, IP address, MAC address, a device identifier or a database name, or a combination thereof. Virtual CI discovery section 411 is inactive when there is no virtual CI instance. During the inactive state, discovery section 401 is active. The setting is performed by virtual CI instance deleting section 414 when virtual CI instance deleting section 414 confirms that every virtual CI instance is deleted. Meanwhile, virtual CI discovery section 411 is set active when a virtual CI instance is created, during which discovery section 401 is set inactive. The setting is performed by virtual CI instance creating section 413 when virtual CI instance creating section 413 first creates the virtual CI instance. Virtual CI discovery section 411 differs from discovery section 401 in the following point. Discovery section 401 detects CIs individually, whereas virtual CI discovery section 411 detects (1) the attribute and relationship of a CI defined in virtual model table 417, (2) an attribute and relationship unique to a virtual data model, and (3) an attribute and relationship needed to determine the establishing condition for the virtual data model. The "attribute" unique to a virtual data model is an attribute which is not used in attributes of individual configuration items forming the virtual data model but is used only in the attribute of the virtual data model. Likewise, the "relationship" unique to a virtual data model is a relationship which is not used in relationships of individual configuration items forming the virtual data model but is used only in the relationship of the virtual data model. Information (data) collected by virtual CI discovery section 411 is used in virtual CI identifying section 412 and attribute/relationship update section 404.

Discovery table 406 stores discovery information (202 in FIG. 2B, 302 in FIG. 3). Both of discovery instance 202 (FIG. 2B) associated with data model 201 (FIG. 2B) for a CI and discovery instance 302 (FIG. 3) associated with virtual data model 301 (FIG. 3) for a virtual CI can be stored in discovery table 406. As another embodiment, discovery instance 202 (FIG. 2B) associated with data model 201 (FIG. 2B) for a CI may be stored in a discovery table different from a discovery table where discovery instance 302 (FIG. 3) associated with virtual data model 301 (FIG. 3) for a virtual CI is stored.

Attribute/relationship update section 404 reflects the value of an updated attribute or relationship of a CI to a corresponding CI instance stored in CMDB 405. That is, attribute/relationship update section 404 updates the value of an updated attribute or relationship of a corresponding CI instance. Likewise, attribute/relationship update section 404 reflects the value of an updated attribute or relationship of a virtual CI to a corresponding virtual CI instance stored in CMDB 405. The reflection ensures tracking for a CI instance and a virtual CI instance.

Virtual model table 417 stores virtual data model 301 (FIG. 3). Virtual CI instance creating section 413 uses virtual data model 301 (FIG. 3) at the time of creating one set of data (virtual CI instance) indicating a predetermined attribute of a virtual CI and a relationship with another CI.

Relationship table 408 stores relationship models 204 (FIG. 2B) and 304 (FIG. 3). Both of relationship model 204 (FIG. 2B) associated with data model 201 (FIG. 2B) of a CI and relationship model 304 (FIG. 3) associated with virtual data model 301 (FIG. 3) for a virtual CI can be stored in relationship table 408. As another embodiment, relationship model 204 (FIG. 2B) associated with data model 201 (FIG. 2B) for a CI is stored in a relationship table different from a relationship table where relationship model 304 (FIG. 3) associated with virtual data model 301 (FIG. 3) for a virtual CI is stored.

Figure 5:
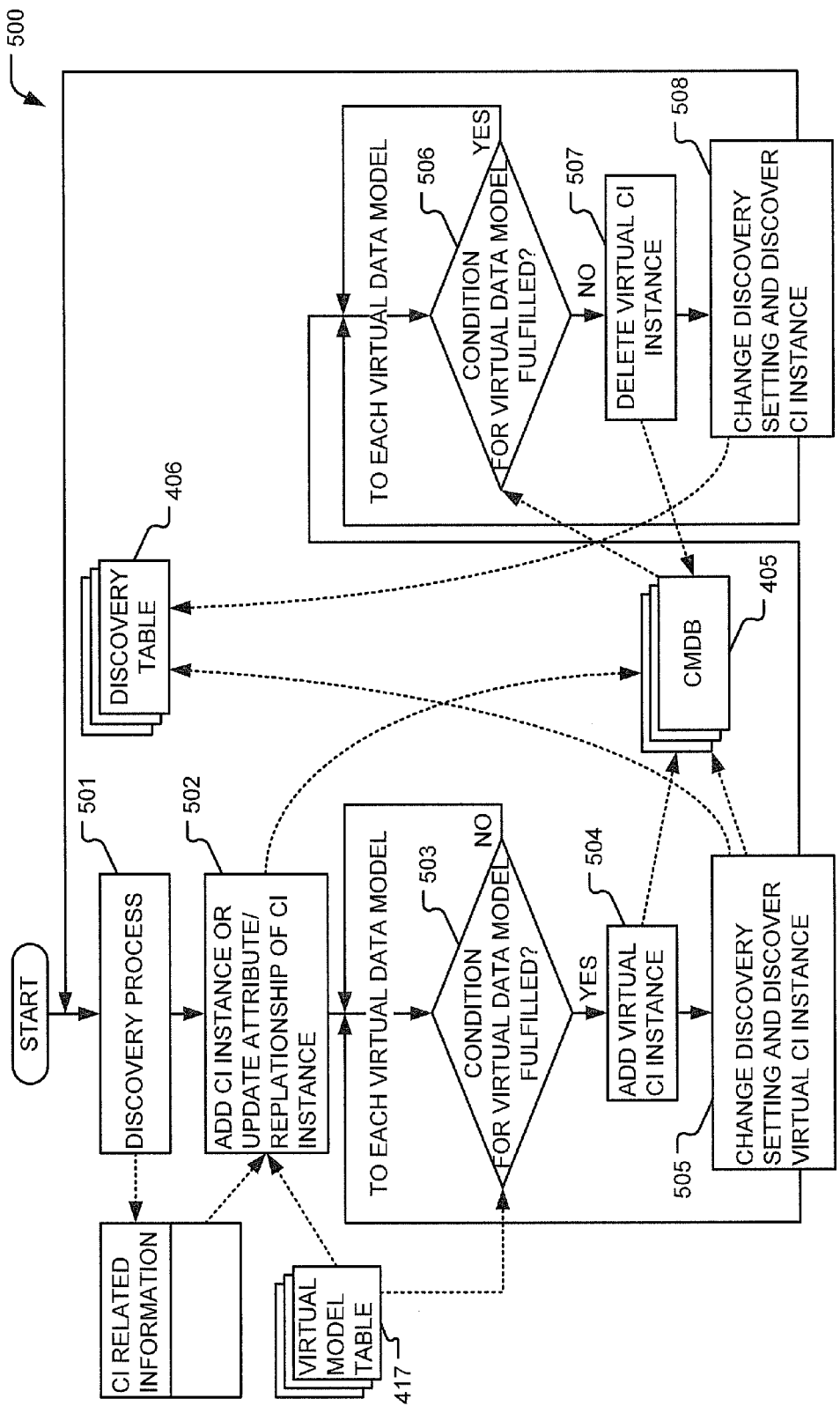
FIG. 5 shows the flows of generation and deletion of a CI instance.

FIG. 5 shows the flows of generation and deletion of a CI instance according to an embodiment of the present invention. According to a collection condition (collection target: attribute and relationship) designated in a discovery instance stored in discovery table 406, discovery section 401 detects information on configuration items as managed targets connected to computer system 400 over a network (step 501). The detection interval can be set arbitrarily by the administrator of computer system 400. The detection interval may be, for example, one day, one week, one month or the like. As a result, discovery section 401 detects information on a device A and a device B. Discovery section 401 passes the information on device A and device B to CI identifying section 402.

Upon receipt of the information from discovery section 401, CI identifying section 402 performs a process on the detection result (step 502). CI identifying section 402 refers to CMDB 405 and determines whether the information on device A and device B is information on a new CI or the value of the updated attribute or relationship of an existing CI. When the CI information relates to a new CI, CI identifying section 402 passes the information to CI instance creating section 403. When the CI information relates to the value of the updated attribute or relationship of an existing CI, CI identifying section 402 passes the information to attribute/relationship update section 404.

According to data model 201 (FIG. 2B) stored in model table 407 and relationship model 204 (FIG. 2B) stored in relationship table 408, CI instance creating section 403 creates one set of data (CI instance as an example) indicating a predetermined attribute of a CI and a relationship with another CI from information on the CI. The created CI instance is stored in CMDB 405.

Attribute/relationship update section 404 reflects the value of the updated attribute or relationship of a CI to a corresponding CI instance stored in CMDB 405.

When the created CI instance is stored in CMDB 405 or the value of the attribute or relationship of the CI instance is updated, virtual CI identifying section 412 determines whether the CI instance stored in CMDB 405 fulfills an establishing condition (model establishing condition) for a virtual data model according to a time designated by the administrator of computer system 400 (step 503). When the establishing condition is not fulfilled (No), virtual CI identifying section 412 then determines whether the CI instance fulfills an establishing condition (model establishing condition) for another virtual data model. When the establishing condition is fulfilled (Yes), virtual CI identifying section 412 checks if a virtual CI instance which can be created as a result of the establishing condition being fulfilled is already registered with CMDB 405. When the virtual CI instance is already registered with CMDB 405, virtual CI identifying section 412 does not pass the information on the CI to virtual CI instance creating section 413. When the virtual CI instance is not registered with CMDB 405, virtual CI identifying section 412 passes the CI instance fulfilling the establishing condition or information on the CI instance to virtual CI instance creating section 413.

Virtual CI instance creating section 413 adds the created virtual CI instance into CMDB 405 according to the definition of virtual data model 301 (FIG. 3) stored in virtual model table 417 (step 504). When a CI instance stored in CMDB 405 fulfills an establishing condition (model establishing condition) for a virtual data model, virtual CI instance creating section 413 automatically generates a virtual CI instance from the CI instance.

In accordance with the addition, virtual CI instance creating section 413 changes the discovery setting (step 505). Specifically, virtual CI instance creating section 413 determines whether a plurality of CI instances as configuration items are to be discovery targets or removed therefrom. Further, virtual CI instance creating section 413 sets the status of discovery instance 302 (FIG. 3) stored in discovery table 406 and associated with the virtual CI instance active.

Virtual CI instance deleting section 414 determines whether the virtual CI instance fulfills the establishing condition defined in virtual data model (step 506). When the establishing condition is fulfilled (Yes), virtual CI instance deleting section 414 then determines whether other virtual CI instances fulfill the establishing condition (model establishing condition) defined in the virtual data model associated with the virtual CI instance. When the establishing condition is not fulfilled (No), virtual CI instance deleting section 414 deletes the virtual CI instance which does not fulfill the establishing condition defined in the virtual data model any more from CMDB 405 (step 507).

In accordance with the deletion, virtual CI instance deleting section 414 sets the status of discovery instance 302 (FIG. 3) associated with the virtual CI instance inactive (step 508). Further, virtual CI instance deleting section 414 deletes a description of the virtual CI instance from "attributes to be collected" of a corresponding discovery instance in discovery table 406. Further, virtual CI instance deleting section 414 changes the statuses of a plurality of CI instances forming the virtual CI instance to be deleted active from inactive.

Figure 6A:
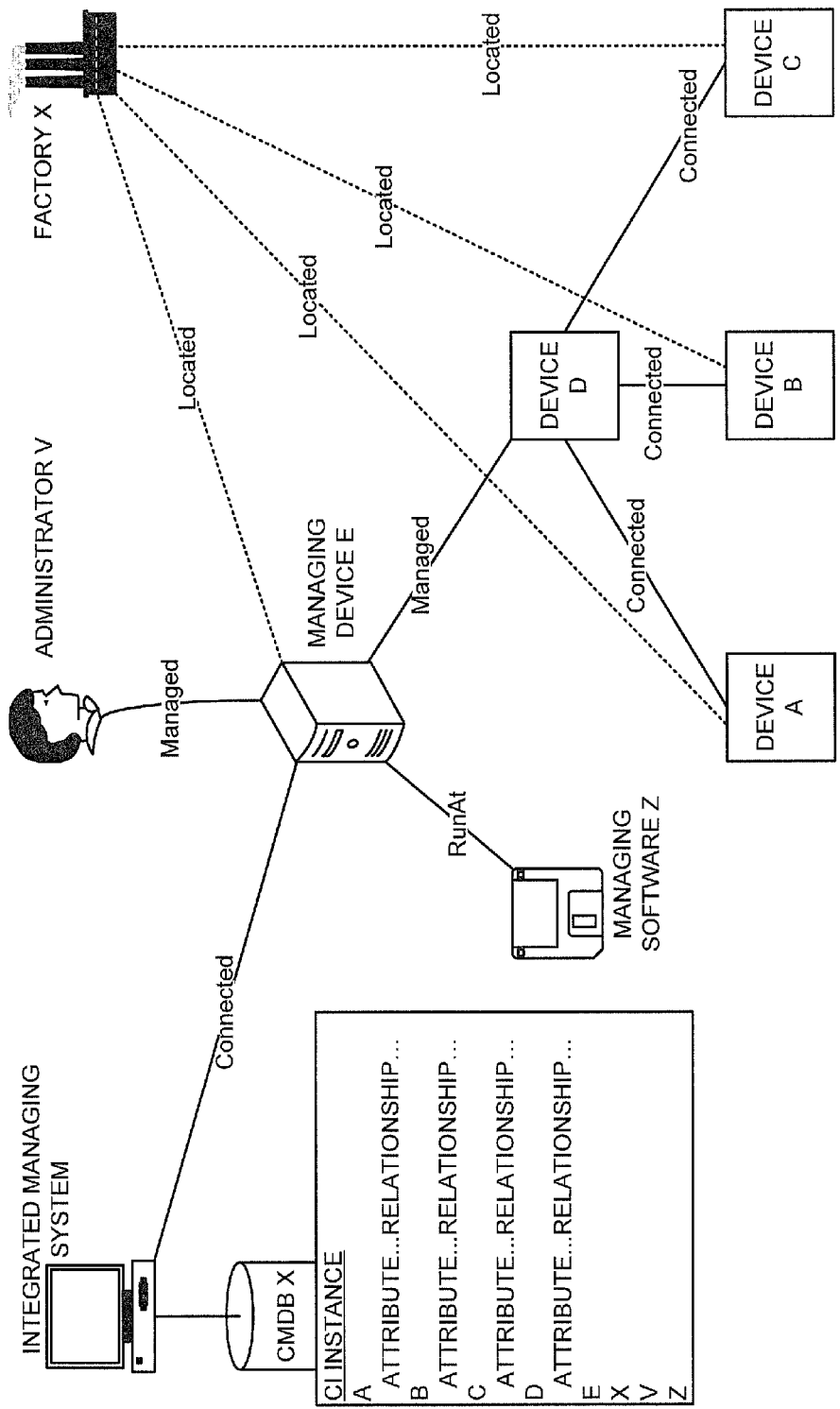
FIG. 6A shows an example where each configuration item is managed.

FIG. 6A shows an example where industrial devices or the like are managed item by item. The individual CI instances of devices A to D, the CI instance of a managing device E, the CI instance of a factory X, the CI instance of an administrator V, and the CI instance of managing software are stored in CMDB (CMDB X). Discovery section 401 (FIG. 4) detects information on the configuration items for each configuration item according to the discovery scheme described in discovery information 202 (FIG. 2B).

Figure 6B:
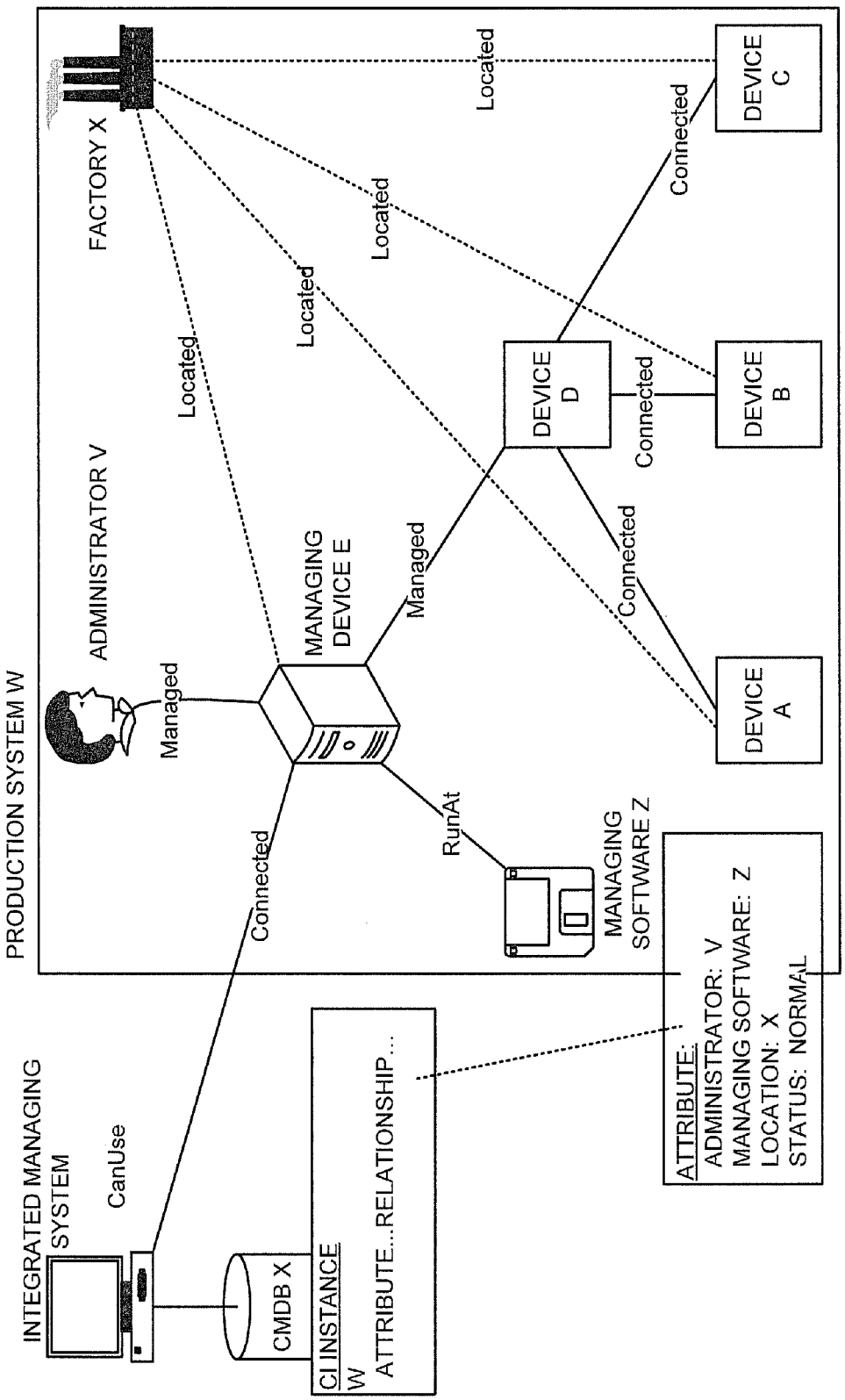
FIG. 6B shows an embodiment wherein a plurality of configuration items are managed as a single virtual CI.

FIG. 6B shows an embodiment wherein the CI instances of devices A to D, the CI instance of managing device E, the CI instance of factory X, the CI instance of administrator V and the CI instance of managing software Z are managed as a virtual CI instance or a single production system W (virtual CI). The virtual CI instance of production system W or a virtual CI is stored in CMDB (CMDB X). The statuses of the CI instances of devices A to D, the CI instance of managing device E, the CI instance of factory X, the CI instance of administrator V and the CI instance of managing software Z are set inactive.

The virtual CI instance of production system W includes, for example, attributes "administrator", "managing software" and "location". The attributes "administrator" and "managing software" are some of the configuration items forming the virtual CI instance of production system W. Therefore, the attributes "administrator" and "managing software" are attributes unique to production system W, and are not attributes which are included in the individual configuration items forming the virtual CI instance of production system W. The attribute value V of the administrator and the attribute value Z of the managing software are obtained from the configuration items (administrator V, managing software Z) forming the virtual CI instance of production system W.

The relationship between production system W and the integrated managing system is "CanUse". The relationship is unique to production system W, and is not included in each configuration item forming the virtual CI instance of production system W. Virtual CI discovery section 411 detects information on a virtual CI unit, i.e., information on production system W, according to the discovery scheme defined in the virtual data model of production system W. The detection permits the administrator to perform management by CMDB on the basis of each virtual CI, e.g., management by discovery and tracking on the basis of each virtual CI.

Figure 7A:
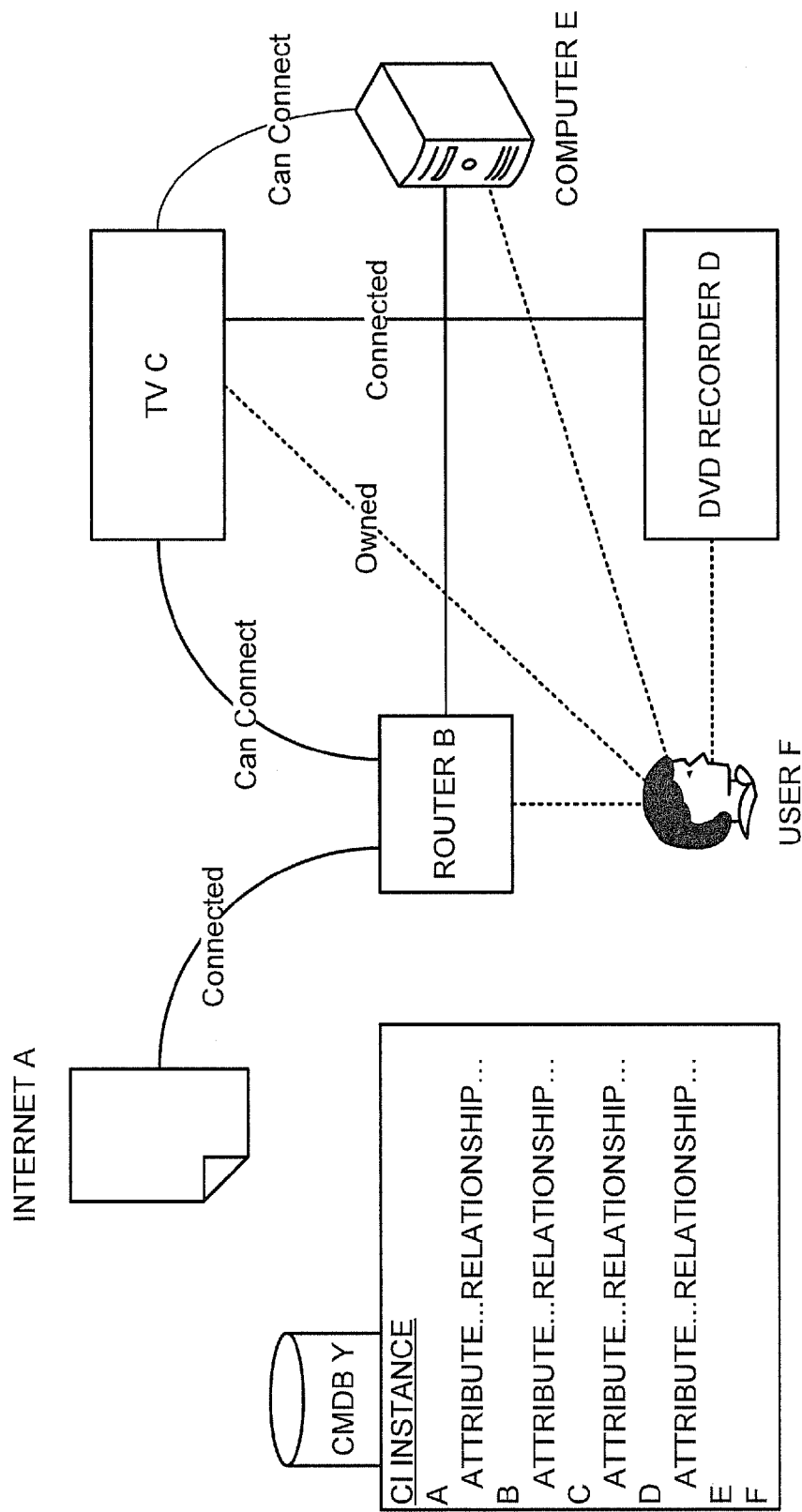
FIG. 7A shows an example where each configuration item is managed.

FIG. 7A shows an example in which electric home appliances or the like are managed for each configuration item. The CI instances of the Internet A, router B, TV C, DVD recorder D, computer E and user F are stored in CMDB (CMDB Y). Discovery section 401 (FIG. 4) detects information on the configuration items item by item according to the discovery scheme described in discovery information 202 (FIG. 2B).

Figure 7B:
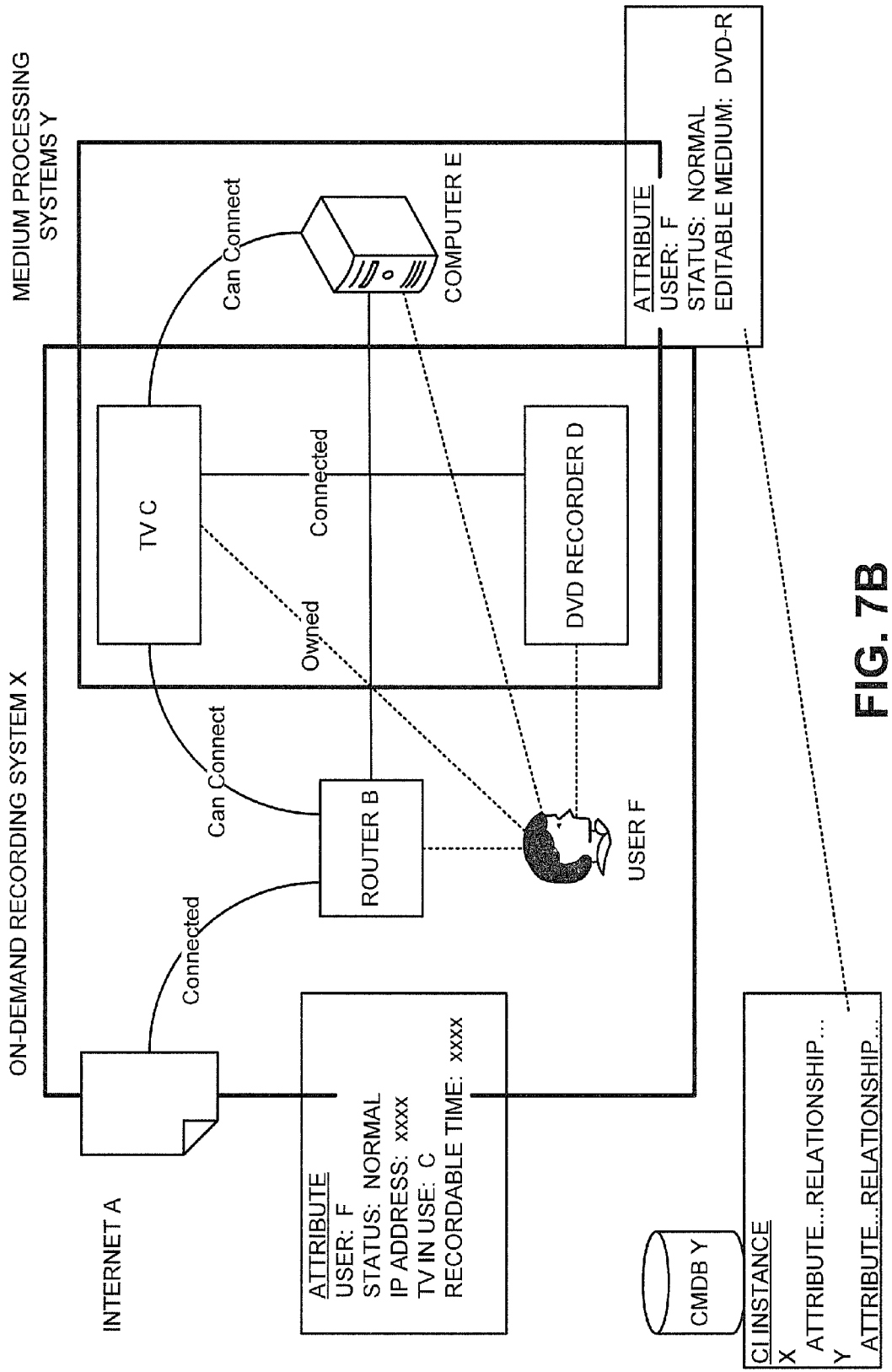
FIG. 7B shows an embodiment wherein a plurality of configuration items are managed as a single virtual CI.

FIG. 7B shows an embodiment wherein the CI instance of the Internet A, the CI instance of router B, the CI instance of TV C, the CI instance of DVD recorder D and the CI instance of user F are managed as one on-demand recording system X (virtual CI), while TV C, DVD recorder D and computer E are managed as a virtual CI instance or one medium processing system Y (virtual CI). The virtual CI instance of the on-demand recording system X, which is a virtual CI, the CI instance of the medium processing system Y (virtual CI) are stored in CMDB (CMDB Y). The statuses of the CI instance of the Internet A, the CI instance of router B, the CI instance of TV C, the CI instance of DVD recorder D and the CI instance of user F are set inactive.

The virtual CI instance of the on-demand recording system X includes attributes "user", "IP address", "TV in use" and "recordable time". The attributes "user" and "TV in use" are some of the configuration items forming the virtual CI instance of the on-demand recording system X. Therefore, the attributes "user" and "TV in use" are attributes unique to the on-demand recording system X, and are not attributes included in the configuration items forming the virtual CI instance of the on-demand recording system X. The attribute value F of the user and the attribute value C of the TV in use are acquired from the configuration items (user F, TV C) forming the virtual CI of the on-demand recording system X. The virtual CI instance of the medium processing system Y includes attributes "user" and "editable medium". The on-demand recording system X and the medium processing system Y include the configuration items "TV C" and "DVD recorder D" in duplication. Such use of virtual CIs can allow virtual CIs to include a single CI in each virtual CI. Virtual CI discovery section 411 detects information on a virtual CI unit, namely information on the on-demand recording system X and medium processing system Y, according to the discovery scheme defined in the virtual data model of the on-demand recording system X and the virtual data model of the medium processing system Y. The detection permits the administrator to perform management by CMDB on the basis of each virtual CI, e.g., management by discovery and tracking on the basis of each virtual CI.

The computer system according to the embodiment includes a CPU and a main memory which are connected to a bus. The CPU preferably has a 32-bit or 64-bit architecture; for example, the Xeon series, Core series, Pentium series, and Celeron series of Intel Corporation (Xeon, Core, Pentium, and Celeron are trademarks or registered trademarks of Intel Corporation or its subsidiaries in the United States and other countries), the Phenom series and Athlon series of Advanced Micro Devices, Inc. (Phenom and Athlon are trademarks or registered trademarks of Advanced Micro Devices, Inc.) can be used. The bus is connected with a display like an LCD monitor via a display controller. The display is used to display information on a computer connected to a network via a communication circuit and information on software running on the computer through an adequate graphic interface for the management of the computer system. The bus is also connected with a hard disk or silicon disk, and a CD-ROM or DVD drive via an IDE or SATA controller.

The hard disk stores an operating system (OS), a program which provides the Java processing environment like J2EE, an operation control program for the CMDB, other programs and data in a manner that they are loadable into the main memory. The operation control program may include TADDM (Tivoli Application Dependency Discovery Manager) which is provided by International Business Machines Corporation.

Particular embodiments of the computing system of the present disclosure can take the form of an entirely hardware embodiment, an entirely software embodiment or an embodiment containing both hardware and software elements. In a particular embodiment, the disclosed methods are implemented in software that is embedded in a processor readable medium and executed by a processor, which includes but is not limited to firmware, resident software, microcode, etc.

Further embodiments of the present disclosure can take the form of a computer program product accessible from a computer-usable or computer-readable medium providing program code for use by or in connection with a computer or any instruction execution system. For the purposes of this description, a computer-usable or computer-readable medium can be any apparatus that can tangibly embody a computer program and that can contain, store, communicate, propagate, or transport the program for use by or in connection with the instruction execution system, apparatus, or device.

In various embodiments, the medium can include an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

The CD-ROM or DVD drive is used so that a program is additionally installed onto the hard disk from a CD-ROM or DVD as needed. The bus is further connected with a keyboard and a mouse via a keyboard/mouse controller.

A communication interface conforms to, for example, the Ethernet protocol, and is connected to the bus via a communication controller to physically connect the computer and the communication circuit and provide the TCP/IP communication protocol of the communication capability of the operating system of the computer with a network interface layer. The communication circuit may be a cable LAN environment or a wireless LAN environment which conforms to the wireless LAN connection specifications, such as IEEE802.11a/b/g/n.

As a network connecting unit for connecting hardware like a computer, a router, a hardware control console and so forth are available in addition to the aforementioned network switch. The network connecting unit has a capability of returning configuration information, such as the IP address and MAC address of a computer connected to a computer on which the network operation control program is installed, in response to an inquiry in the form of a predetermined command from the latter computer. The network switch and router include an ARP table containing a list of pairs of IP addresses of computers connected thereto and corresponding MAC addresses for an address resolution protocol (ARP), and have a capability of returning the content of the ARP table in response to an inquiry in the form of a predetermined command. The hardware control console can return computer configuration information more detailed than the ARP table.

The hardware control console is connected to the computer. The hardware control console has functions to divide a single computer into a plurality of partitions using LPAR (Logical PARtition) and allow different OSs, such as Windows (Windows is a trademark of Microsoft Corporation in the United States, other countries, or both) and Linux (Linux is a registered trademark of Linus Torvalds in the United States, other countries, or both), in the individual partitions by VMware. Systematic inquiry to the hardware control console can provide detailed information in individual logical partitions of the computer running with LPAR*.VMware.

Although an embodiment has been described above, the described contents of the embodiment are merely an example, and it should be apparent to those skilled in the art that various changes and improvements can be made to the embodiment without departing from the scope of the invention. For example, instead of a CMDB and CIs stored therein, another type of database and another type of CI can be used. Besides Java, any computer developing environment which can call up an API having a network control function, such as C++ or C#, can be used.

The invention claimed is:
1. A method of managing a plurality of configuration items, the method comprising:
holding a set of data at a repository describing each of a plurality of configuration items, wherein each of the plurality of configuration items includes a computer hardware resource or a computer software program resource, and wherein the set of data for each of the plurality of configuration items includes a plurality of attributes including at least a name of the configuration item, a description of the configuration item, and a relationship of the configuration item with another configuration item for which another set of data is included in the repository;
detecting information indicating that at least two configuration items are determined to operate in combination as a functional unit;
creating a new set of data for a virtual configuration item from the information detected regarding the at least two configuration items determined to operate in the combination as the functional unit;
storing the new set of data for the virtual configuration item in the repository; and
managing the new set of data for the virtual configuration item representing the at least two configuration items in the combination as a single configuration item.

2. The method of claim 1, wherein detecting the information indicating that at least two configuration items are determined to operate in combination at the functional unit includes:
detecting first information on a first configuration item and second information on a second configuration item having a predetermined relationship with the first configuration item; and
determining whether the first information on the first configuration item and the second information on the second configuration item fulfill a predetermined condition wherein the first configuration item and the second configuration item may be determined to operate as a new combination in a new functional unit.

3. The method of claim 2, wherein the new set of data indicates at least one predetermined attribute of the new combination of the first configuration item and the second configuration item and an additional relationship with another configuration item.

4. The method of claim 3, further comprising treating the new combination as the virtual configuration item in response to the determination that the predetermined condition is fulfilled.

5. The method of claim 4, wherein the determination that the predetermined condition is fulfilled is performed according to a data model defining the predetermined condition for establishing the virtual configuration item.

6. The method of claim 5, wherein the data model further includes a description of a discovery scheme for detecting the information indicating that the at least two configuration items are determined to operate in combination at the functional unit.

7. The method of claim 6, wherein the description of the discovery scheme is provided by designating discovery information having at least one of attribute data and relationship data that is to be collected for the virtual configuration item.

8. The method of claim 5, wherein the data model further includes a description of handling each attribute of the first configuration item and each attribute of the second configuration item.

9. The method of claim 5, wherein the data model further includes a description of handling a plurality of relationships of the first configuration item and a plurality of relationships of the second configuration item.

10. The method of claim 5, wherein the new set of data for the virtual configuration item further includes an additional attribute that is different from a first attribute of the first configuration item and a second attribute of the second configuration item.

11. The method of claim 5, wherein the new set of data for the virtual configuration item further includes the additional relationship that is different from a first preexisting relationship of the first configuration item and a second preexisting relationship of the second configuration item.

12. The method of claim 4, further comprising:
in response to creation of the new set of data for the virtual configuration item, setting a status of the virtual configuration item as active; and
setting a status of at least one of one set of data of the first configuration item and one set of data of the second configuration item as inactive.

13. A method for managing a plurality of configuration items, the method comprising:
holding a set of data at a repository for each of a plurality of configuration items, wherein each of the plurality of configuration items includes one of a computer hardware resource and a computer software program resource;
detecting information related to two or more of the plurality of configuration items indicating that the two or more of the plurality of configuration items operate as a functional unit; and
creating, from the information, a new set of data representing the functional unit as a virtual configuration item, wherein the new set of data is stored in the repository and the two or more of the plurality of configuration items that operate as the functional unit are managed in combination as the virtual configuration item instead of managing the two of more of the plurality of configuration items separately.

14. The method of claim 13, further comprising:
detecting first information on a first configuration item and second information on a second configuration item that has a predetermined relationship with the first configuration item: and
determining whether the first information on the first configuration item and the second information on the second configuration item meet a predetermined condition indicating that the first configuration item and the second configuration item operate as the functional unit.

15. The method of claim 14, wherein the new set of data identifies at least one predetermined attribute of a combination of the first configuration item and the second configuration item and identifies a relationship of the combination of the first configuration item and the second configuration item with another configuration item.

16. The method of claim 14, wherein in response to the determination that the predetermined condition is met, storing the new set of data in the repository to represent the virtual configuration item.

17. The method of claim 16, wherein the determination that the predetermined condition is met is performed according to a data model defining a condition for establishing the virtual configuration item.

18. The method of claim 17, wherein the data model further includes a description of a discovery scheme for detecting the information indicating that that the two or more of the plurality of configuration items operate as a functional unit.

19. The method of claim 18, wherein the description of the discovery scheme is provided by designating discovery information including at least one of attribute data and relationship data that is to be collected for the virtual configuration item.

20. A computer system for managing a plurality of configuration items, the computer system comprising:

a repository that holds data for each of a plurality of configuration items, wherein each of the plurality of configuration items includes one of a hardware resource and a software program resource, and wherein the data includes at least one predetermined attribute of a first configuration item and a relationship with a second configuration item;

a discovery section to detect information related to the first configuration item and the second configuration item indicating that the first configuration item and the second configuration item operate in combination as a functional unit; and a data creating section that creates, from the information detected by the discovery section, a new set of data describing a virtual configuration item, wherein the new set of data for the virtual configuration item is stored in the repository and the virtual configuration item is managed as a single configuration item instead of separately managing the first configuration item and the second configuration item.

* * * * *